(No Model.) 5 Sheets—Sheet 3.
E. G. VAN PELT.
SEED PLANTER.
No. 398,476. Patented Feb. 26, 1889.
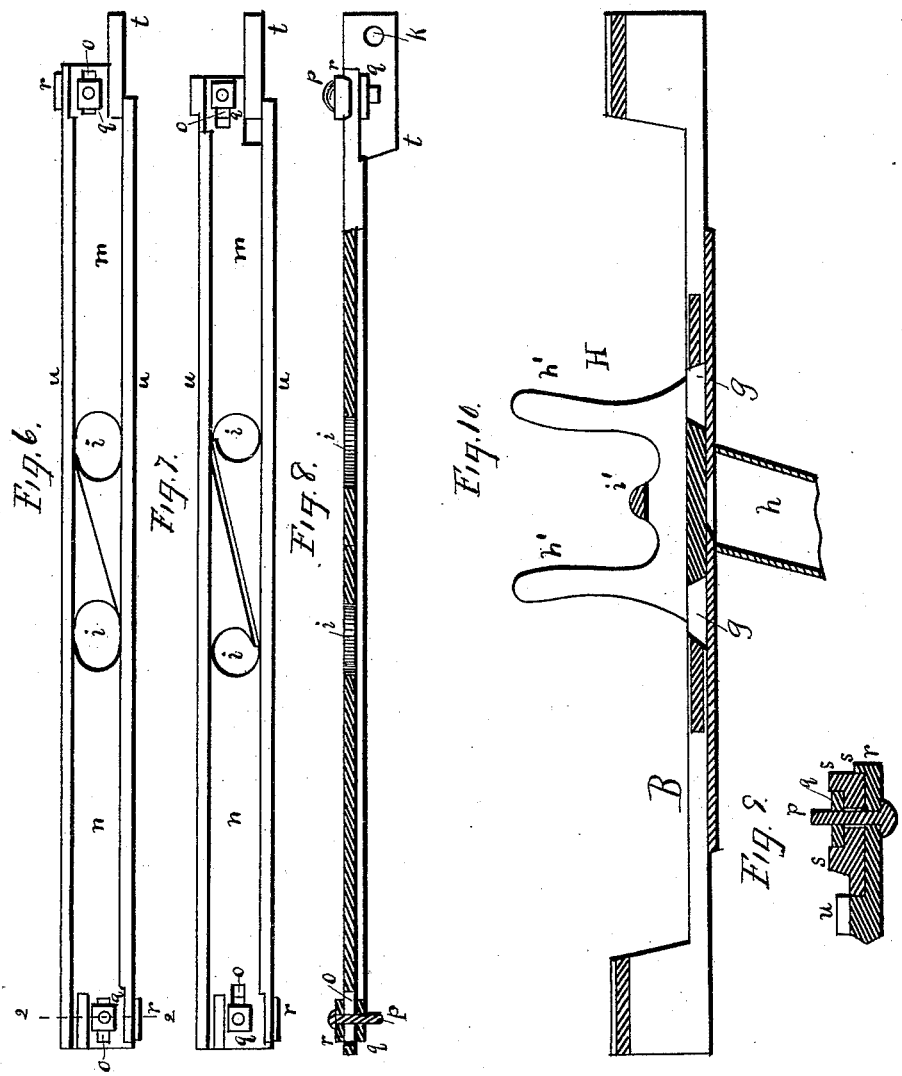
WITNESSES
W. A. Jones
A. S. Brown
INVENTOR,
E. Gerry Van Pelt
by J S Brown
Attorney.

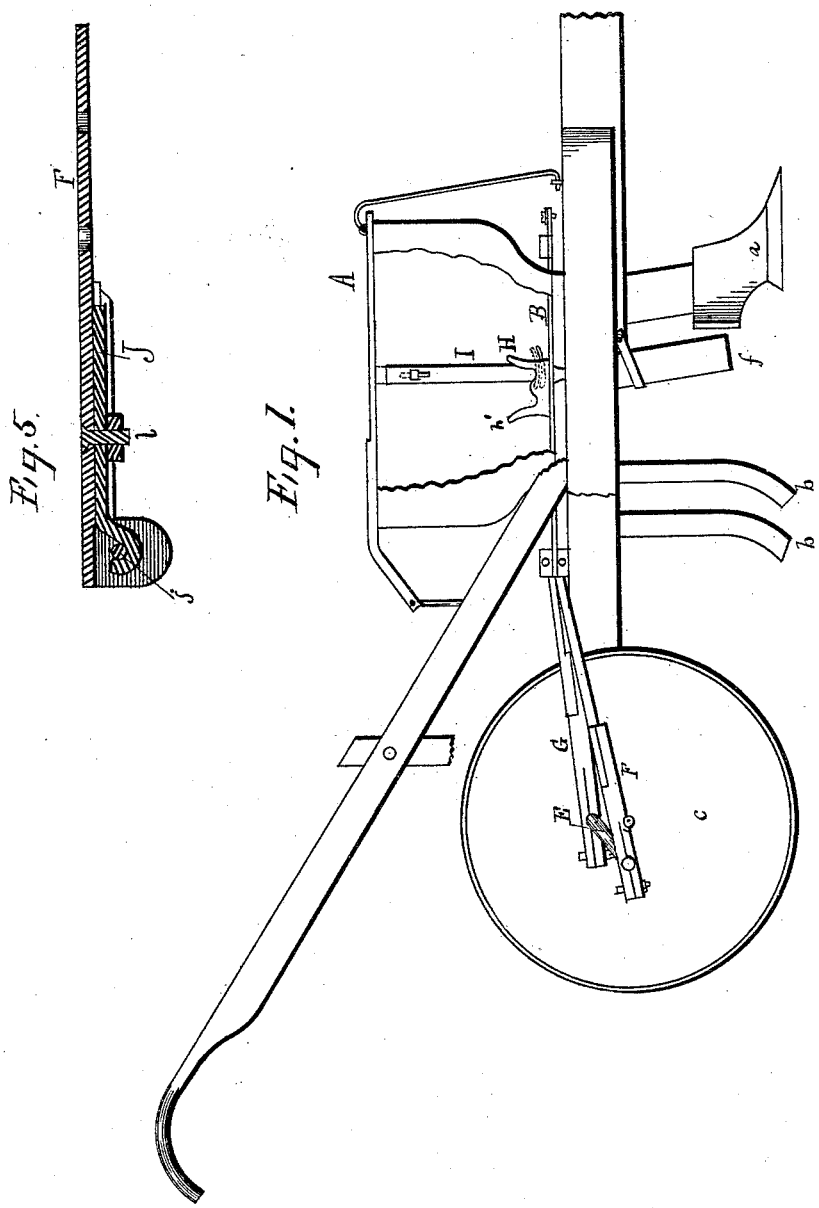

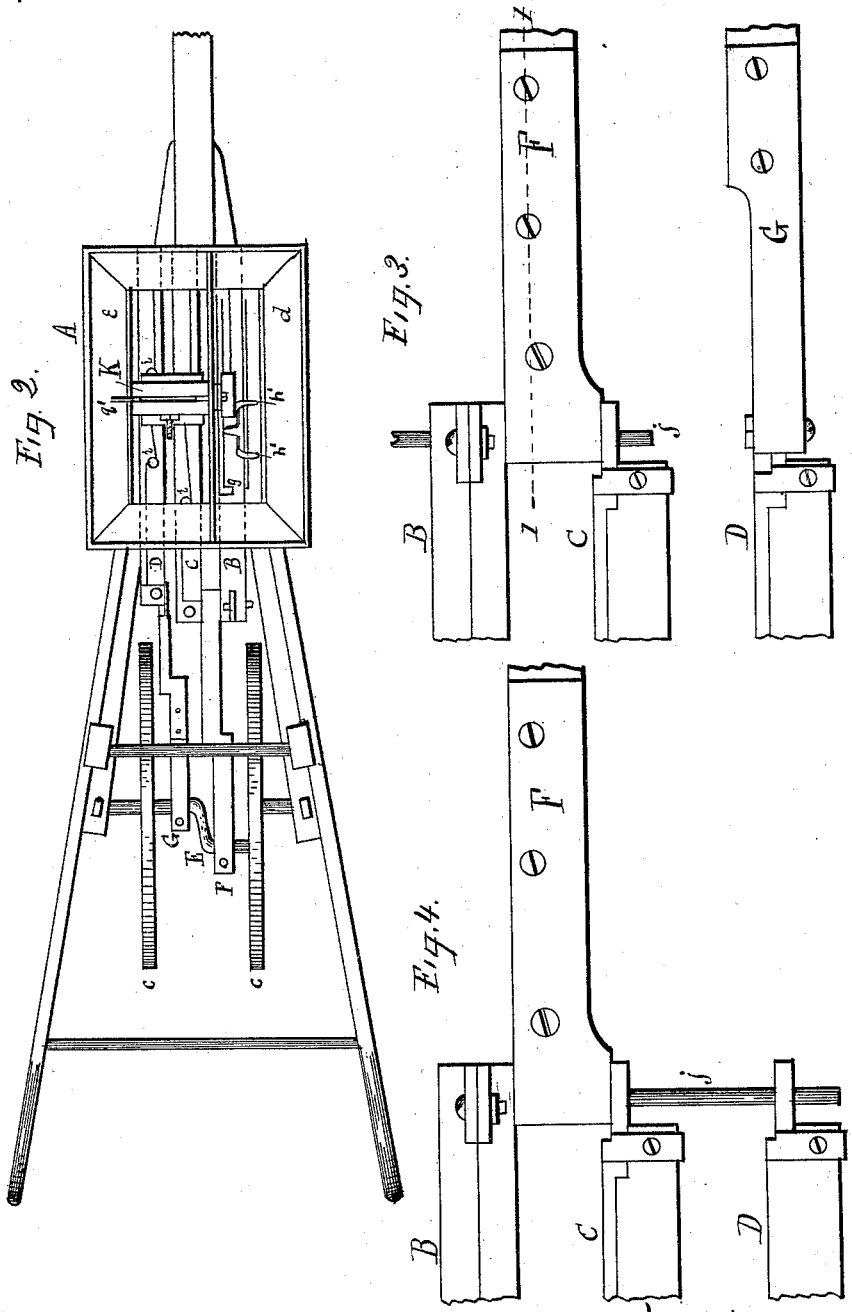

(No Model.) 5 Sheets—Sheet 4.
E. G. VAN PELT.
SEED PLANTER.
No. 398,476. Patented Feb. 26, 1889.
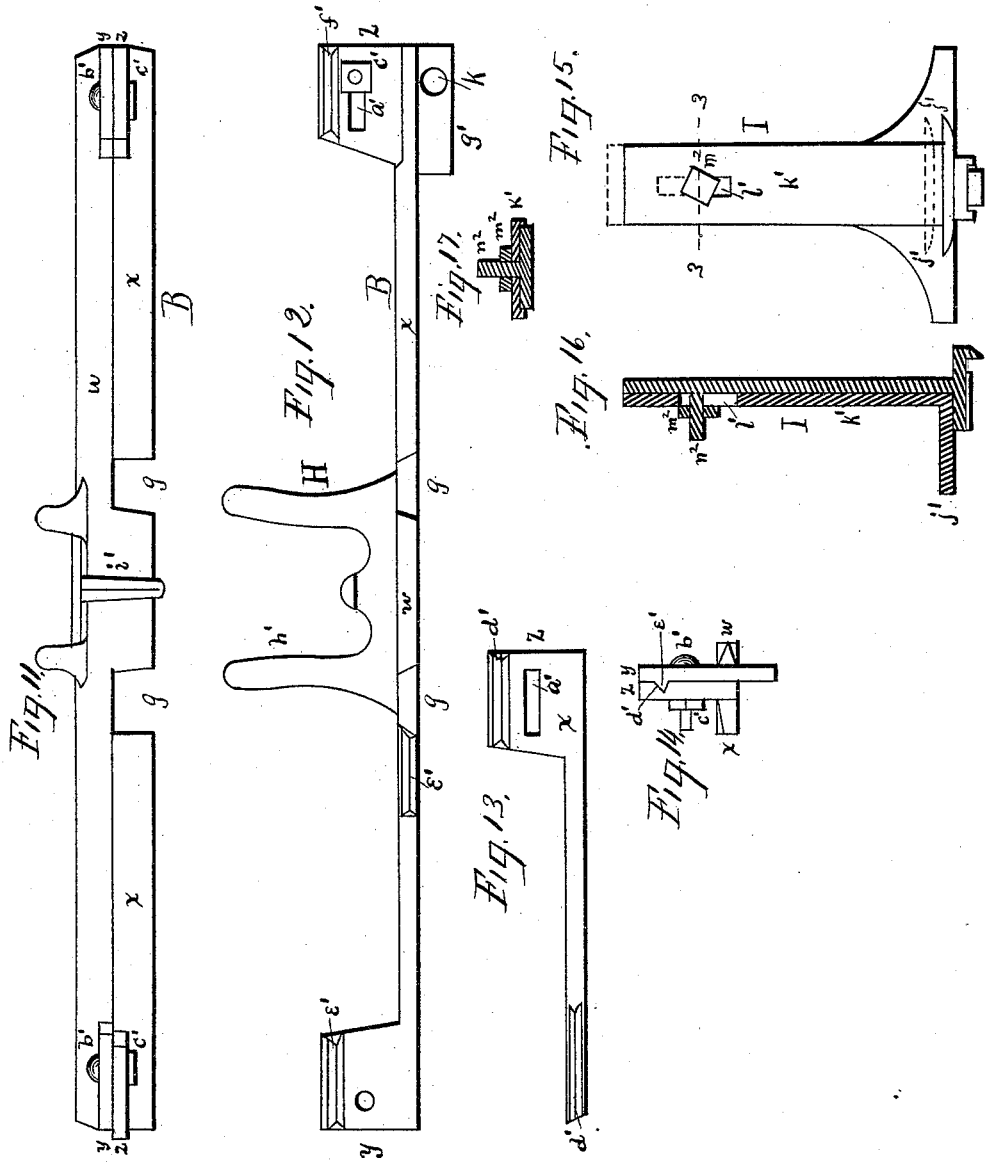
Witnesses.
W. A. Jones
A. S. Brown.
Inventor
E. Gerry Van Pelt.
by J P Brown
Attorney

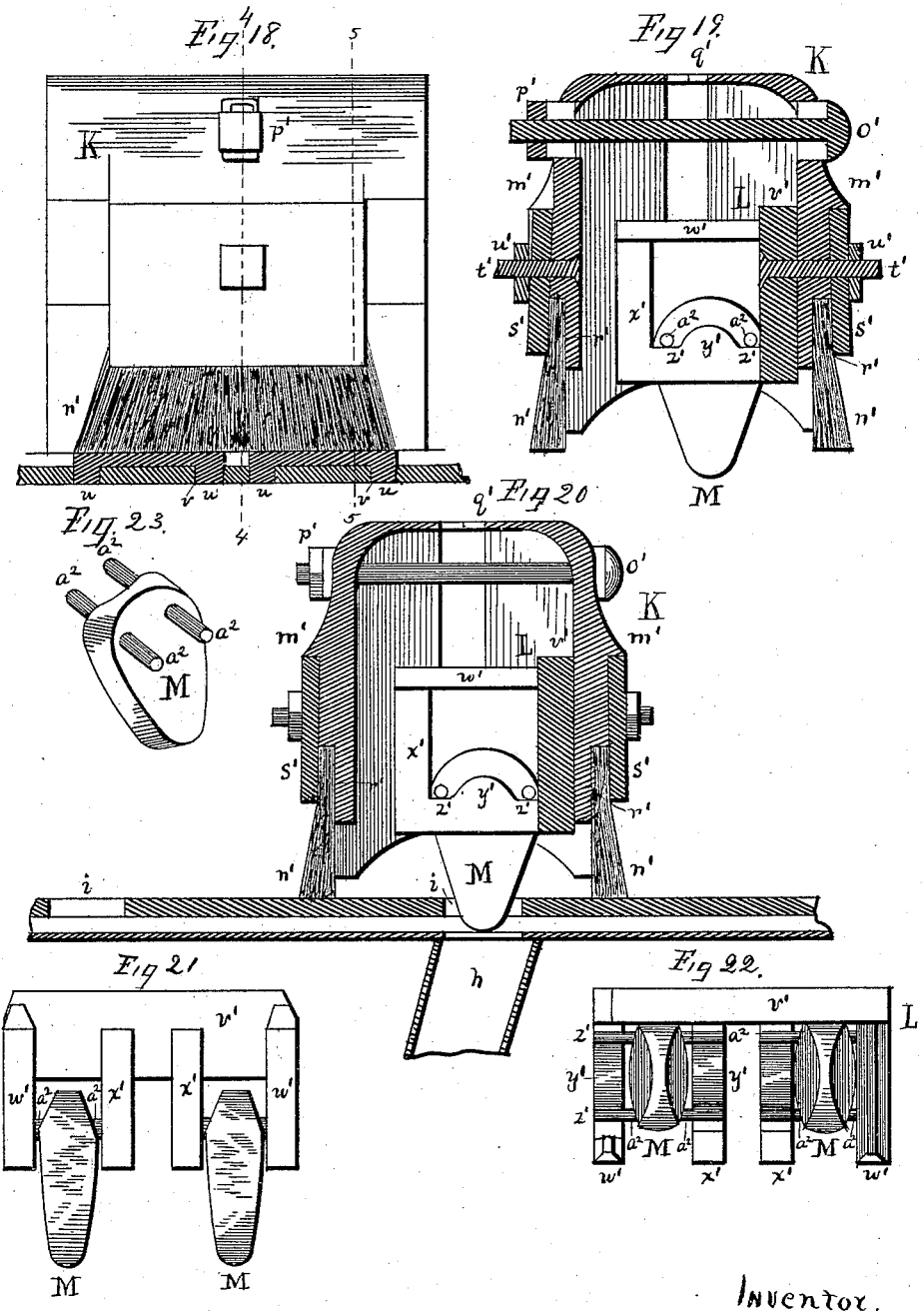

UNITED STATES PATENT OFFICE.

ELBRIDGE GERRY VAN PELT, OF CENTRE HALL, PENNSYLVANIA.

SEED-PLANTER.

SPECIFICATION forming part of Letters Patent No. 398,476, dated February 26, 1889.

Application filed May 1, 1883. Serial No. 93,563. (No model.)

*To all whom it may concern:*

Be it known that I, ELBRIDGE GERRY VAN PELT, of Centre Hall, in the county of Centre and State of Pennsylvania, have invented an Improved Seed-Planter; and I do hereby declare the following to be a full and exact description thereof, reference being had to the accompanying drawings, making part of this specification.

My invention relates to seed-planters which are adapted to plant seeds at certain definite distances apart and deposit fertilizing material at the same time; and it consists in seed and fertilizer gage-slides of improved construction and operation, and also in a device for preventing the pouring of the fertilizer, in an improved brush device, and in a device for insuring the dropping of the seed.

In the drawings, Figure 1 is a side view of my improved planter, a part of the framework and side being broken away to show interior parts. Fig. 2 is a top view of the same, the cover of the hopper being removed. Fig. 3 (which, with the remaining figures, is on an enlarged scale) is a top view of a portion of the fertilizer-measuring slide, the seed-measuring slides, and connecting-rods, showing their arrangement when the seed is to be dropped closely. Fig. 4 is a similar view showing the arrangement of the slides when the seed is to be dropped at a greater distance apart. Fig. 5 is a section in the line 1 1, Fig. 3. Fig. 6 is a bottom view of one of the seed-slides adjusted to drop large-sized seeds. Fig. 7 is a similar view showing the slide adjusted for smaller seeds. Fig. 8 is a side view of the same, partly in section. Fig. 9 is a section of the same in the line 2 2, Fig. 6. Fig. 10 is a central section of the fertilizer-slide and a portion of the bottom of the hopper. Fig. 11 is a top view of the fertilizer-slide. Fig. 12 is a side view of the same with a part removed. Fig. 13 is an interior side view of the part removed. Fig. 14 is an end view of the fertilizer-slide. Fig. 15 is a front view of the shoe. Fig. 16 is a central longitudinal section thereof. Fig. 17 is a section in the line 3 3, Fig. 15. Fig. 18 is a front view of the brush-holder. Fig. 19 is a section thereof in the line 4 4, Fig. 18. Fig. 20 is a section of the brush-holder in the line 5 5, Fig. 18, and also showing a portion of one of the seed-slides and bottom of the hopper in section. Fig. 21 is a front view of the grate. Fig. 22 is a top view thereof. Fig. 23 is a perspective view of one of the clearers.

Like letters designate corresponding parts in all the figures.

My improvements are adapted to be used in a seed-planter planting a single row at a time, of the character shown in the drawings, which is provided with a plow-point, $a$, covering-shovels $b$ $b$, wheels $c$ $c$, hopper A in two compartments, $d$ $e$, for holding the fertilizing material and seed, respectively, and discharging-spout $f$, all of which parts form no part of my invention, and may be of any convenient and suitable construction and arrangement.

For the purpose of dropping and gaging the fertilizer, I provide a slide, B, at the bottom of the compartment $d$ with suitable gaging holes or measurers, $g$ $g$. At the bottom of the compartment below the slide is an opening, $h$, for conveying the fertilizer to the discharging-spout $f$. The slide B moves backward and forward, filling the gaging-holes $g$ $g$ with the fertilizer and discharging it through the aperture $h$ when the holes $g$ $g$ pass over the aperture. For dropping and gaging the seed, I provide two slides, C D, in the compartment $e$ of the hopper, each provided with suitable gaging-holes or measurers, $i$ $i$, which deposit the seed through openings $h$ in like manner as the fertilizer is deposited.

The several slides B C D are operated by a crank, E, of peculiar construction, fixed to the wheels $c$ $c$. The crank is a double one, to one part of which the connecting-rod F, which operates the fertilizer-slide B and one of the seed-slides C, is pivoted, and to the other part is pivoted the connecting-rod G, which operates the other seed-slide, D.

Each seed-slide is provided with two openings, $i$ $i$, so that one reaches its position over the discharging-aperture $h$ when the crank is at its most forward position, and the other reaches the same position when the crank is at its most rearward position, so that each slide deposits seed twice with each revolution of the wheels. The double crank E is so arranged that one seed-slide follows the other by a quarter-revolution, so that the two slides will drop four times at equal distances with each revolution of the wheels. To accomplish this, the crank is arranged so that neither end is situated at the center of either wheel, but both ends are situated at equal distances from the centers of the wheels to which they are respectively attached, and so that planes passing through the junctions of the ends of the crank with the wheels and the centers of the wheels shall be at right angles with each other. The result of this arrangement is that one slide will follow the other at a quarter of a revolution of the wheels. The fertilizer-slide B is operated by the same connecting-rod F which operates one of the seed-slides, C. When it is desired to drop double the amount of seed at a time at double the distance, the crank-rod G is removed, and the coupling-rod $j$, which couples the connecting-rod F to the slides B C, is moved so as to couple the slide D as well, as shown in Fig. 4. To render the rod $j$ easily adjustable, it moves freely in the holes $k\ k$ in the slides and connecting-rods, and is held firmly in place by the clamping-plate J, which is adjusted by means of the bolt $l$, as shown in Fig. 5.

The seed-slides C D are adjustable, so that the measuring-apertures $i\ i$ may be regulated in size for different-sized seeds. Each slide is composed of two parts, $m\ n$, of the shape shown, which are adjustable longitudinally so as to increase or diminish the size of the apertures $i\ i$, as shown in Figs. 7 and 8. The adjustment is effected by means of slots $o\ o$—one at the end of each part $m\ n$—in which plays a screw, $p$, which holds the two parts securely together by means of the nut $q$. Each part $m\ n$ is formed at one end with a laterally-extending projection, $r$, through which the clamping and adjusting screw $p$ passes. Suitable guides or ways, $s\ s$, hold the parts in correct position. The extent of adjustment depends on the length of the slots $o\ o$. One of the parts of the slide, as $m$, is formed with a projection, $t$, to which the connecting-rod is coupled. The various projections and parts for effecting the adjustment are all outside of the seed-hopper A, so as to afford easy access to them and not interfere with the easy working of the slide. The tops of the slides C D are level, offering no projection to interfere with their easy working, and the bottom is provided with projecting sides $u\ u$, which run in grooves $v\ v$ in the bottom of the hopper, as seen in Fig. 18.

The fertilizer-slide B is formed with two measuring-apertures, $g\ g$, adjustable to regulate the quantity of fertilizer to be deposited. It is composed of one rigid part, $w$, and two longitudinally-adjustable parts, $x\ x$. Each end of the part $w$ is formed with an upwardly-extending projection $y$, and each adjustable part $x$ is at its outer end provided with a corresponding projection, $z$.

The projections $z\ z$ are formed with longitudinal slots $a'\ a'$, the length of the slots determining the extent of adjustment. The parts $x\ x$ are secured to the part $w$ by adjusting-screws $b'\ b'$, playing in the slots $a'\ a'$ and nuts $c'\ c'$.

To hold the parts $x\ x$ in position on the part $w$, grooves $d'\ d'$ are formed therein, which slide on projecting ways $e'\ e'$ on the part $w$. Ways or projections $f'\ f'$ assist further in retaining the parts in position. The sides of the apertures $g\ g$ are beveled underneath, as shown, to prevent the fertilizer clogging. A downwardly-extending projection, $g'$, is formed on the part $w$ for coupling to the connecting-rod F or G. All the projecting and adjusting parts of the slide B are outside of the hopper A, so that they are easily accessible. A stirrer, H, is fixed to the slide B, preferably at its center and traveling therewith. It is composed of two upwardly and outwardly projecting arms, $h'\ h'$, and one horizontally and inwardly projecting arm, $i'$, as shown.

In order that the fertilizer-slide, which has but two measuring-apertures, may discharge fertilizing material every time that the two seed-slides (each of which has two measuring-apertures) drop seed, the apertures $g\ g$ are placed at a distance apart less than the sweep of the crank E, so that each aperture passes twice over the discharging-opening $h$ during each revolution of the crank. The distance between the discharging-apertures $g\ g$ can be nicely determined, so that the dropping of the fertilizer will exactly time with the dropping of the seed. It will be noticed that the distance between the apertures $g\ g$ must remain constant, the distance between them being accurately determined once for all when the machine is made, and that the adjustments which are given to the apertures for regulating the quantity of the fertilizer to be discharged do not affect the distance between the apertures.

To prevent the fertilizer from pouring through the aperture $g$ when it is over the opening $h$, I provide a vertically-adjustable shoe, I, which is situated directly over the opening $h$. This shoe is formed of a horizontally and outwardly projecting part, $j'$, which extends over the hole $h$ to prevent the fertilizer pouring therethrough, and a vertical part, $k'$, which is formed with a slot, $l'$, which permits and controls the vertical adjustment by means of a nut, $m^2$, and screw $n^2$, attached to the partition between the compartments $d\ e$, or a piece fastened thereto. Besides preventing the pouring of the fertilizing material, this shoe I, by means of its vertical adjustment, performs another important function.

It is evident that the fertilizer-slide by itself will discharge four times with each revolution of the crank; but as I have provided for dropping double the quantity of seed at double the distance by coupling the two seed-slides to the same connecting-rod, as already specified, it is necessary that some means should be adopted so that the fertilizer-slide shall drop but twice to each revolution of the crank, the increase of quantity being already provided for by the adjustment of the measuring-apertures $g\ g$, and this object is completely accomplished by means of the vertically-adjustable shoe I. The apertures $g\ g$ of the fertilizer-slide being at a distance apart less than the sweep of the crank, it follows that each aperture will pass beyond the discharging-opening $h$ on each side, each aperture passing a relatively-long distance beyond the discharging-opening on one side and a much shorter distance beyond on the opposite side of said opening. Now, the outwardly-projecting part $j'$ of the shoe I is of a length equal to or somewhat greater than the space covered by the short distances which the two apertures $g\ g$ travel on opposite sides of the discharging-opening $h$. When then the shoe I is adjusted at or near its lowest vertical point, the projecting part $j'$ will nearly or quite touch the top of the slide B, and the apertures $g\ g$ can only fill when they travel their long distances from the discharging-opening $h$ out beyond the shoe I, so that when the shoe is adjusted low down the fertilizer-slide will discharge only twice to each revolution of the crank. When, however, it is desired to deposit the fertilizing material four times—as when the seed-slides are working separately—the shoe I is adjusted at or near its maximum height, so as to permit the apertures $g\ g$ to fill freely when traveling their short distances beyond the opening $h$ and when working separately to its highest point.

For permitting only the seed which is in the measuring-apertures $i\ i$ of the seed-slides to be dropped, I provide a double brush, K. The brush box or holder is composed of two parts or cases, $m'\ m'$, and to each case is secured a brush, $n'$. The two cases $m'\ m'$ are held together by a bolt, $o'$, and nut $p'$, so that they may be easily taken apart. The two cases $m'\ m'$ are placed on either side of guides or ways $q'\ q'$, attached to the sides of the seed-compartment $e$ of the hopper A, and they may be held in any position on said guides by the bolt $o'$ and nut $p'$, although they are so held normally that the brushes shall just graze the top surfaces of the slides C D. The brushes $n'\ n'$ fit in recesses $r'\ r'$, formed in the cases $m'\ m'$, where they are held by plates $s'\ s'$, which are secured by screws $t'\ t'$ and nuts $u'\ u'$, thus permitting the brushes to be readily removed and replaced.

Between the cases $m'\ m'$ is placed a grate, L, which is secured to one of the cases $m'$ by the screw $t'$ and plate $u'$, which hold the plate $s'$ and brush $n'$. This grate is composed of a back, $v'$, two four-sided bars, $w'\ w'$, and two three-sided bars, $x'\ x'$. The bottom side of each of these four arms, $w'\ w'\ x'\ x'$, is formed with a central projection, $y'$, leaving two bearings, $z'\ z'$—one on each side.

Between each set of bars $w'\ x'$ is suspended an oval-shaped clearer, M, for the insertion of which the top side of the bar $x'$ is omitted, which is suspended by pivots $a^2\ a^2$, resting in the bearings $z'\ z'$. The pivots $a^2\ a^2$ preferably form integral parts of the clearer M, and are four in number—two on each side—and rest, respectively, in the four bearings $z'\ z'$ in the bars $w'\ x'$. The clearers M M are so situated that they hang directly over the apertures, $h$, leading to the discharging-spout $f$. The clearers M M when hanging vertically reach below the top surfaces of the seed-slides C D, and their double pivots permit them to swing both ways, so as not to interfere with the operation of the slides, and so as to drop into either aperture $i$ when it passes under either clearer. In case any seed should catch in the opening $i$ of either slide, the clearer M by its weight dropping into the opening will force the seed through and insure its being planted.

The various parts of the slides, shoe, brush-cases, grate, clearers, and other parts may be all cast of iron, the shapes of all permitting easy casting, and, as they require no finish, the whole machine can be made very economical.

What I claim as my invention, and desire to secure by Letters Patent, is—

1. In a seed-slide, two similar parts, $m\ n$, arranged oppositely to each other and constructed as shown, so that two measuring-apertures, $i\ i$, are formed therein, each of said similar parts being formed with a laterally-extending projection, $r$, at one end, and with a longitudinally-extending slot, $o$, at the other end, the slot on one part being over the projection on the other, in combination with adjusting-screws and nuts $p\ q$, said adjusting-screws being adapted to pass through the projections $r\ r$ and work in the slots $o\ o$, substantially as set forth.

2. In a seed-slide, the two similar parts $m\ n$, arranged oppositely to each other and constructed as shown, so that two measuring-apertures are formed therein, each part being formed with a projection, $r$, and a slot, $o$, located as shown and described, in combination with adjusting screws and nuts, and the guides $s\ s$, adapted to hold the parts $m\ n$ in correct relative position, substantially as set forth.

3. In a fertilizer-slide, the combination of a fixed part extending the whole length of the slide, provided with upwardly-extending projections on each end and with a laterally-extending central projection, two adjustable parts formed with upwardly-extending slotted projections, said parts being located on the same side as the central projection, and means of adjustment whereby apertures of varying size may be formed between said adjustable parts and the laterally-extending central projection on the fixed part, substantially as set forth.

4. In a fertilizer-slide, the combination of the fixed part $w$, formed with upwardly-extending projections $y\ y$ and projecting ways $e'\ e'$, the adjustable parts $x\ x$, formed with upwardly-extending projections $z\ z$ and grooves $d'\ d'$, and means of adjustment, substantially as set forth.

5. The combination of a fertilizer-slide and a stirrer formed with two upwardly and outwardly projecting arms and one horizontally and inwardly extending arm mounted on said slide and traveling with it, substantially as set forth.

6. The combination of the fertilizer-slide B and the stirrer H, formed with two upwardly and outwardly projecting arms, *h′ h′*, and one horizontally and inwardly projecting arm, *i′*, said stirrer being located on and traveling with said slide, substantially as set forth.

7. The combination of the crank E, the connecting-rod F, the fertilizer-slide B, provided with two adjustable measuring-apertures, *g g*, located at a distance apart less than the sweep of the crank E, the discharging-opening *h*, and the vertically-adjustable shoe I, situated above said discharging-opening and constructed with a part, *j′*, overhanging the slide, of a length equal to or greater than the sum of the short distances which the apertures *g g* travel on opposite sides of the opening *h*, substantially as set forth.

8. In a seed-planter, a double-crank shaft the cranks of which are set at an angle of ninety degrees to each other, and the ends of which are eccentrically attached to the two driving-wheels of the planter at equal distances from the respective centers thereof, substantially as set forth.

9. The combination of a double-crank shaft, the cranks set at an angle of ninety degrees, fertilizer and seed slides, and connecting-rods, substantially as set forth.

10. The combination, with one fertilizer-slide, two seed-slides, and two connecting-rods, of a double-crank shaft, the cranks set at an angle of ninety degrees, one of said connecting-rods operating the fertilizer-slide and one of the seed-slides, and the other connecting-rod operating the remaining seed-slide, substantially as set forth.

11. A double-crank operating-shaft, two seed-slides, a fertilizer-slide, a rod connecting one of the cranks of said shaft with one of said seed-slides, and a rod connecting the other crank with the fertilizer-slide and the remaining seed-slide, in combination with adjustable connections between said rods and slides, whereby the slides may be operated either from one or both cranks, substantially as set forth.

12. The combination of the two seed-slides, each constructed with two measuring-apertures, the fertilizer-slide constructed with two measuring-apertures, a double-crank shaft, the cranks set at an angle of ninety degrees, and the connecting-rods, substantially as set forth.

13. The combination of the connecting-rod F and the adjustable coupling-rod *j* with the clamp J and means of adjustment, substantially as set forth.

14. The double crank E, the connecting-rods F G, the seed-slides C D, each constructed with two measuring-apertures, *i i*, and connected, respectively, with the rods F and G, in combination with the fertilizer-slide B, provided with two measuring-apertures, *g g*, located at a distance apart less than the sweep of the crank E, said slide B being connected to the rod F, substantially as set forth.

In testimony whereof I have hereunto signed my name in presence of two witnesses.

E. GERRY VAN PELT.

Witnesses:
A. S. BROWN,
EMMA M. GILLETT.